A. SMITH.
MACHINE FOR REDUCING CRACKLINGS, &c., FOR FERTILIZERS.
No. 4,265. Reissued Feb. 14, 1871.
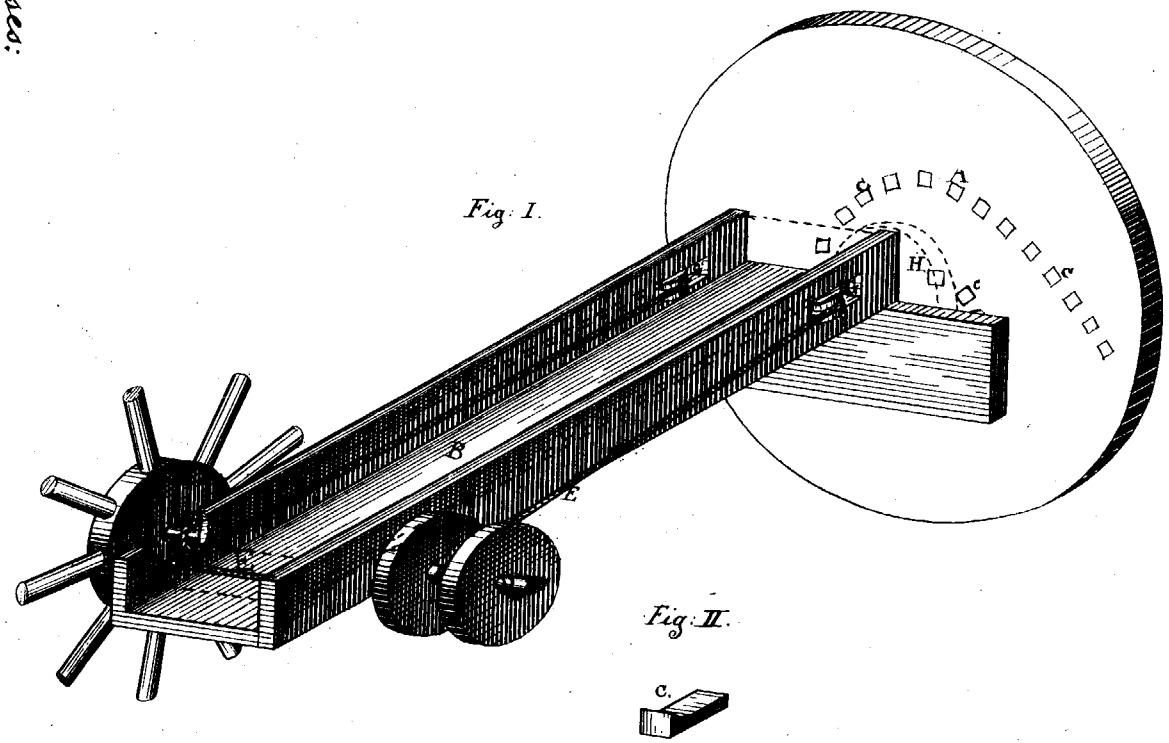
Witnesses:
Wm. H. Fisher.
J. W. Cox.
Inventor:
Amor Smith
per Fisher & Fisher
Attys.
THE NORRIS PETERS CO., PHOTO-LITHO., WASHINGTON, D. C.

United States Patent Office.

AMOR SMITH, OF CINCINNATI, OHIO.

Letters Patent No. 71,545, dated November 26, 1867; reissue No. 4,265, dated February 14, 1871.

IMPROVEMENT IN MACHINES FOR REDUCING CRACKLINGS, &c., FOR FERTILIZERS.

The Schedule referred to in these Letters Patent and making part of the same.

Be it known that I, AMOR SMITH, of Cincinnati, in the county of Hamilton and State of Ohio, have invented certain new and useful Improvements in Cutting-Machines for Reducing Cracklings for the Press, of which the following is a specification.

My invention relates to uniting a box or trough for the reception of cracklings, with a cord-and-pulley device for pressing the cracklings through the trough and feeding them at will to a cutting apparatus; and also to the combination of such a feeding device, with a revolving wheel and knives, in such a manner that the cracklings will be fully prepared for pressing.

In the accompanying drawing—

Figure 1 is a perspective view of the whole machine.

Figure 2 is a view of the cutters.

The same letters in both figures indicate identical parts.

*General Description.*

A is a wheel which, when in operation, revolves across an open end of the box or trough B.

Wheel A has a series of holes through it, as shown, to receive the cutters C C, &c. These cutters are shown in fig. 2, and are formed with a cutting lip projecting in the direction of their revolution.

G G′ are pulleys in the sides of the box, near the wheel A.

D is an axis connected with the box, and placed at such distance from the pulleys as is requisite for the successful operation of the cord.

E is the cord, as indicated by dotted lines, which passes around the pulley G, then across the trough, then around pulley G′, and finally around axis D, on the other side of the trough.

The mode in which my machine operates is as follows, viz:

That part of the cord E which is on the inside of the trough is drawn back so that it lies close to the sides of the trough, and passes across the trough at or near its rear end, behind where the cracklings are to lie, (see fig. 1.) The cracklings to be cut are then placed in the box or trough B. The cord E is then tightened by means of a windlass or other appropriate winding mechanism attached to the axis D, until that part of the cord which crosses from side to side of the trough, near its rear end, is drawn up tightly against the rear end of the cracklings. The wheel A being made to revolve at a sufficiently high rate of speed to cut the cracklings which may be presented to its knives, the axis D is now so turned as to gradually shorten the cord equally on both sides of the cracklings. The cracklings are thus forced forward in the trough and brought under the knives or cutting-teeth of the revolving wheel, and are there properly cut.

If thought desirable a board or compressing-head may be placed against the rear end of the cracklings in the trough, and the rear part of the cord passes around and behind said board, in order to aid in pushing the cracklings forward to the wheel. But the employment of such a compressing-head is not deemed essential to the operation of my invention.

What I claim as my invention, and desire to secure by Letters Patent, is—

1. The combination of the box or trough-frame B and cord E and pulleys G G′, irrespective of the particular cutting apparatus used, substantially as herein described, and for the purposes herein mentioned.

2. The combination of the wheel A, with cutters C, box or trough-frame B, with cord E and pulleys G G′, substantially as herein described, and for the purposes herein set forth.

AMOR SMITH.

Witnesses:
WM. G. HOSEA,
WM. H. FISHER.